US008352796B2

(12) United States Patent
Wechsler et al.

(10) Patent No.: US 8,352,796 B2
(45) Date of Patent: Jan. 8, 2013

(54) SELECTIVE LOGGING BASED ON SET PARAMETER

(75) Inventors: Chesla C. Wechsler, Shrewsbury, NJ (US); John Sutton Robertson, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 519 days.

(21) Appl. No.: 12/561,697

(22) Filed: Sep. 17, 2009

(65) Prior Publication Data

US 2011/0066891 A1     Mar. 17, 2011

(51) Int. Cl.
G06F 11/00         (2006.01)
(52) U.S. Cl. .......................... 714/37; 717/168
(58) Field of Classification Search ............ 714/37
See application file for complete search history.

(56) References Cited

U.S. PATENT DOCUMENTS

| | | | | |
|---|---|---|---|---|
| 5,245,615 | A * | 9/1993 | Treu | 714/45 |
| 5,613,113 | A * | 3/1997 | Goldring | 1/1 |
| 6,802,054 | B2 * | 10/2004 | Faraj | 717/128 |
| 6,871,346 | B1 * | 3/2005 | Kumbalimutt et al. | 718/104 |
| 7,302,634 | B2 * | 11/2007 | Lucovsky et al. | 715/200 |
| 7,340,770 | B2 * | 3/2008 | Freund | 726/11 |
| 7,644,314 | B2 * | 1/2010 | Kurtzeborn et al. | 714/38.14 |
| 7,664,724 | B2 * | 2/2010 | Lucovsky et al. | 707/999.001 |
| 7,769,766 | B1 * | 8/2010 | Dubrovsky et al. | 707/754 |
| 8,015,169 | B1 * | 9/2011 | Gmuender et al. | 707/706 |
| 2002/0100023 | A1 * | 7/2002 | Ueki et al. | 717/127 |
| 2003/0037257 | A1 * | 2/2003 | Wang | 713/200 |
| 2003/0131073 | A1 * | 7/2003 | Lucovsky et al. | 709/219 |
| 2005/0203952 | A1 * | 9/2005 | Deily et al. | 707/104.1 |
| 2005/0268187 | A1 * | 12/2005 | Meaney et al. | 714/723 |
| 2006/0161554 | A1 * | 7/2006 | Lucovsky et al. | 707/10 |
| 2007/0255978 | A1 * | 11/2007 | Kurtzeborn et al. | 714/38 |
| 2008/0005733 | A1 * | 1/2008 | Ramachandran et al. | 717/168 |
| 2008/0065616 | A1 * | 3/2008 | Brown | 707/4 |
| 2009/0049428 | A1 * | 2/2009 | Cozmei | 717/128 |
| 2009/0164377 | A1 * | 6/2009 | Aissi | 705/50 |
| 2009/0172687 | A1 * | 7/2009 | Bobak et al. | 718/104 |
| 2009/0288135 | A1 * | 11/2009 | Chang et al. | 726/1 |
| 2010/0100876 | A1 * | 4/2010 | Glover et al. | 717/178 |
| 2010/0145978 | A1 * | 6/2010 | Anashkin et al. | 707/769 |
| 2010/0251385 | A1 * | 9/2010 | Fellers et al. | 726/28 |
| 2010/0293108 | A1 * | 11/2010 | Gurvitch et al. | 705/36 R |
| 2011/0208822 | A1 * | 8/2011 | Rathod | 709/206 |

OTHER PUBLICATIONS

U.S. Appl. No. 12/580,448 to Fan et al., which was filed on Oct. 16, 2009.

* cited by examiner

*Primary Examiner* — Kamini Patel
(74) *Attorney, Agent, or Firm* — Greenblum & Bernstein, P.L.C.

(57) ABSTRACT

Providing asset-based logging by setting a flag for an identified asset and a transaction includes generating a first detailed log for logging activity related to the identified asset and the transaction by a first application implemented on a first node. A transaction identifier, the flag, and any of the identified asset, information generated by the first application implemented on the first node, information provided to the first application implemented on the first node and a representation of the identified asset is passed to at least one downstream application implemented on at least one second node. Detailed logs generated by the at least one downstream application are correlated with the first detailed log.

20 Claims, 3 Drawing Sheets

SELECTIVE LOGGING BASED ON SET PARAMETER

BACKGROUND

1. Field of the Disclosure

The present disclosure relates to the field of data collection and logging. More particularly, the present disclosure relates to systems and methods for selectively logging an identified asset by setting a parameter.

2. Background Information

Operations and transactions involving database items may require logging to troubleshoot and resolve issues associated with a particular database record or a transaction through a system. That is, in order to resolve a problem associated with a single database record, detailed logging statistics and information may need to be collected for each record in a database or each transaction taking place in the system. Detailed logging of each and every record in the database or transaction in the system consequently results in an increased usage of system resources including processing power, storage space and memory utilization. Further, greater resources are required to adequately parse and interpret the extra collected and logged data, as well as to filter extraneous information.

DETAILED DESCRIPTION

Figure 1:
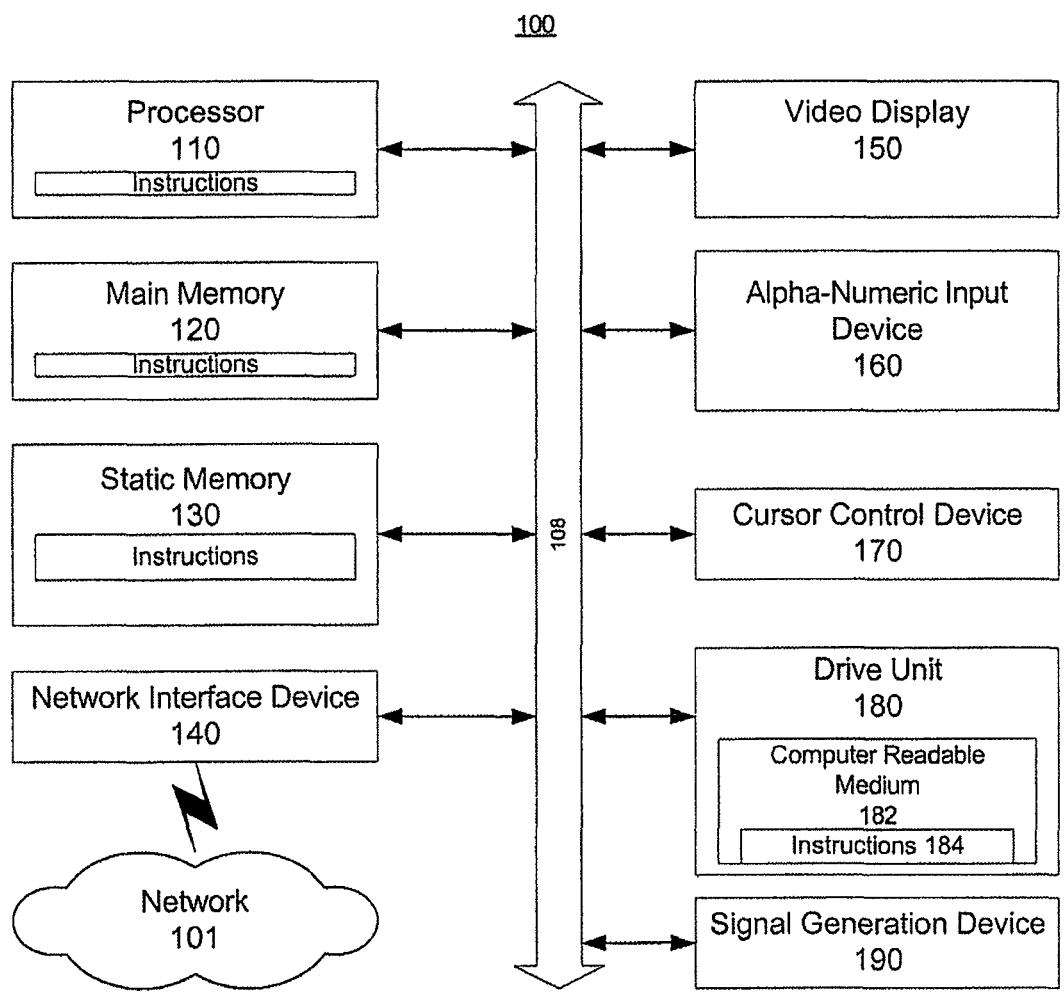
FIG. 1 shows an exemplary general computer system that includes a set of instructions for selectively logging data based on a set parameter.

In view of the foregoing, the present disclosure, through one or more of its various aspects, embodiments and/or specific features or sub-components, is thus intended to bring out one or more of the advantages as specifically noted below.

According to one aspect of the present disclosure, a method of providing asset-based logging includes setting a flag for at least one of an identified asset and a transaction. The method includes generating a first detailed log for logging activity related to at least one of the identified asset and the transaction by a first application implemented on a first node. The method also includes passing a transaction identifier, the flag, and any of the identified asset, information generated by the first application implemented on the first node, information provided to the first application implemented on the first node and a representation of the identified asset to at least one downstream application implemented on at least one second node. The method includes correlating detailed logs generated by the at least one downstream application with the first detailed log.

According to another aspect of the present disclosure, the transaction involves the identified asset.

According to yet another aspect of the present disclosure, the identified asset is a specified subset of objects stored in a data store.

According to still another aspect of the present disclosure, the first detailed log and the detailed logs collect more detailed information than logging information collected for a transaction that is not designated with the flag and the first detailed log and the detailed logs collect more detailed information than logging information collected for an identified asset that is not designated with the flag.

According to one aspect of the present disclosure, a correlated log is used to resolve an issue experienced by a user corresponding to at least one of the identified asset and the transaction.

According to another aspect of the present disclosure, a time to live parameter is set for the flag and the flag is purged after the time to live parameter expires.

According to yet another aspect of the present disclosure, the method includes passing a request, encapsulating the flag and the transaction identifier, to the at least one downstream application.

According to still another aspect of the present disclosure, a path, through the first node and the at least one second node, corresponding to the transaction is undetermined prior to initiating the transaction and a correlated log indicates the path corresponding to the transaction.

According to one aspect of the present disclosure, the detailed log collects information relating to at least one sub-transaction involving the identified asset.

According to another aspect of the present disclosure, the detailed log collects information relating to at least one sub-transaction of the transaction.

According to one aspect of the present disclosure, a system of providing asset-based logging includes a generator that generates a first detailed log to log activity, related to at least one of an identified asset for which a flag is set and a transaction for which the flag is set, by a first application implemented on a first node. The system includes a transmitter that passes a transaction identifier, the flag, and any of the identified asset, information generated by the first application implemented on the first node, information provided to the first application implemented on the first node and a representation of the identified asset to at least one downstream application implemented on at least one second node. The system includes a correlation engine that correlates detailed logs generated by the at least one downstream application with the first detailed log.

According to another aspect of the present disclosure, the first application implemented on the first node is enabled to access a time to live parameter and the flag.

According to yet another aspect of the present disclosure, a level of detail provided by at least one of the first detailed log and the detailed logs is variable.

According to still another aspect of the present disclosure, the system includes an automated rules processor that determines a course of action to resolve an issue based on the correlated log.

According to one aspect of the present disclosure, the first node is at least one of a processor, a network element, a server, a computing device, a physical storage and a physical memory and the at least one second node is at least one of a processor, a network element, a server, a computing device, a physical storage and a physical memory.

According to another aspect of the present disclosure, a correlated log comprises at least one uniform resource locator (URL) link to at least one of: the first detailed log, the detailed logs, a portion of the first detailed log and a portion of the detailed logs.

According to yet another aspect of the present disclosure, the detailed log collects information relating to passage of at least one of: the identified asset and information specified by the identified asset among portions of the first application.

According to still another aspect of the present disclosure, the detailed log collects information from at least one of the identified asset and a user.

According to one aspect of the present disclosure, the course of action does not require human intervention.

According to an aspect of the present disclosure, a tangible computer readable medium that stores a program, recorded on the tangible computer readable medium, for providing asset-based logging includes a setting code segment, recorded on the tangible computer readable medium, that sets a flag for at least one of an identified asset and a transaction. The tangible computer readable medium includes a generating code segment, recorded on the tangible computer readable medium, that generates a first detailed log for logging activity related to at least one of the identified asset and the transaction by a first application implemented on a first node. The tangible computer readable medium includes a passing code segment, recorded on the tangible computer readable medium, that passes a transaction identifier, the flag, and any of the identified asset, information generated by the first application implemented on the first node, information provided to the first application implemented on the first node and a representation of the identified asset to at least one downstream application implemented on at least one second node. The tangible computer readable medium includes a correlating code segment, recorded on the tangible computer readable medium, that correlates detailed logs generated by the at least one downstream application with the first detailed log.

FIG. 1 is an illustrative embodiment of a general computer system, on which a method to provide selective logging based on a set parameter can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 126, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

FIG. 1 is an illustrative embodiment of a general computer system, on which a method of selective logging based on a set parameter, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

As will be disclosed below in further detail, a flag is set for an identified asset accessed by one or more systems. In one embodiment, the identified asset is record in a database, for example, a customer record. In another embodiment, the identified asset is a multimedia object, for example, a digital video, a digital audio, or a graphics file. In yet another embodiment, the identified asset is a collection of one or more stored representations of communications. In still another embodiment, a flag is set for one or more transactions occurring in a system. In yet another embodiment, the one or more transactions access the identified asset.

In another embodiment, the identified asset is a network element. As a non-limiting example, a number of telephones are associated with a private branch exchange (PBX). By enabling a flag for the PBX, calls associated with every user activity that impacts the network element (e.g., the PBX) are logged. In one embodiment, the flag for the PBX is stored in a configuration file for the PBX, or any other data store associated with the PBX. In another embodiment, the flag is stored on the PBX such that it is accessible by an application. In yet another embodiment, the flag is stored in a data store that stores a representation of the PBX as an identified asset.

In one embodiment, the identified asset is stored in a data store. In another embodiment, the data store is a relational database. In yet another embodiment, the data store is a lightweight directory access protocol database.

An agent sets a flag for one or more identified assets. Alternatively, or additionally, the agent sets the flag for one or more transactions. In one embodiment, the one or more transactions involve the one or more identified assets. In another embodiment, assets or records accessed by the one or more transactions are not determined or known a priori, that is, prior to the start of the transaction. In yet another embodiment, the first application is not aware of one or more of the downstream applications. In still another embodiment, the number or identities of applications involved in a transaction are not known a priori.

The flag is set in response to an event or transaction. The agent is either human or automated. The event is any of, but not limited to: a customer inquiry to a call center regarding a product and/or service, a banking transaction, installing or using customer premise equipment, browsing the Internet and using a mobile phone application. In one embodiment, the setting of a verbose parameter initiates an application or system accessing the asset or requesting the asset. In another embodiment, a second event initiates the application or the system accessing the identified asset or requesting the identified asset. In yet another embodiment, the second event initiates the one or more flagged transactions.

Figure 2:
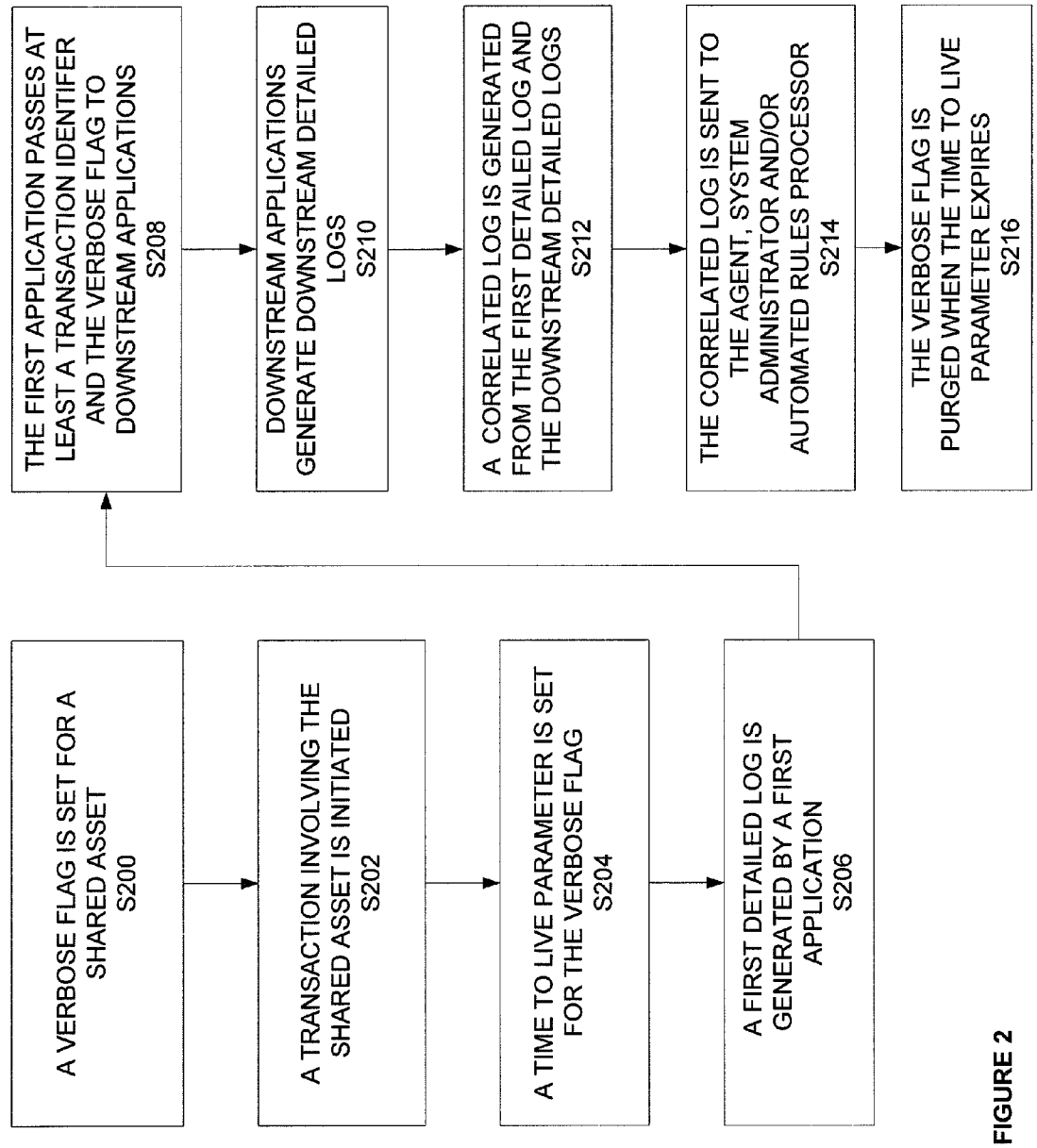
FIG. 2 shows a process flow diagram for selectively logging data based on a set parameter, according to an aspect of the present disclosure.

In FIG. 2, a process flow diagram according to an aspect of the present application is shown. In step S200, an identified asset stored in a centrally located data store is marked with a verbose flag or a verbose logging parameter (hereinafter referred to interchangeably). If the identified asset is, for example, a user record, one of the fields of the user record is entitled "verbose flag". If the identified asset is a network element, then the verbose flag is stored with a representation of the network element in a database or a data store. As will be understood by one of ordinary skill in the art, the verbose flag is any representation or indicator that indicates a desired level of detail a system log.

In step S202, a transaction is initiated that requires the identified asset. The transaction is initiated by a first application. In one embodiment, the first application is enabled to access a data store storing the user record and the user record is an object with a verbose flag that is set. In an exemplary embodiment, the transaction is a banking transaction in which the agent sets the verbose flag for a user record that corresponds to a customer who is unable to access her online banking account. In one embodiment, the transaction does not require access to a predetermined, identified asset and in such case, the transaction is associated with a verbose flag. The terms user, subscriber and customer are used interchangeably hereinafter.

In one embodiment, the detailed log collects enhanced information about transactions or activities involving the identified asset or when the transaction does not require access to a predetermined, identified asset, collects enhanced information about sub-transactions comprising the transaction. With respect to the above-noted Internet bill payment example, when the verbose flag is not enabled, the first application generates a log entry for the banking transaction involving the identified asset that indicates "bill not successfully paid". When the verbose flag is set, the first application generates a log entry that indicates, for example, sub-transactions including "retrieving the account; starting a credit check; credit check failed with credit card clearinghouse; and transaction cancelled funds not transferred".

In another embodiment, when the user record is associated with a verbose flag and when the customer makes a second attempt to access her online banking account via an Internet bill payment application, the Internet bill payment application will access the flagged user record (again) and the Internet bill payment application generates a log for the flagged user record that is more detailed than logs generated for other, unflagged user records. In this example, a second event (i.e., the customer attempting to re-access the user record) initiates the first application accessing the identified asset or requesting the identified asset. In another embodiment, when the agent sets the verbose flag, the banking transaction is re-initiated by the first application (i.e., the Internet bill payment application in the above-noted example), without intervention on the part of the customer. In the above-noted example, for every banking transaction in which a customer attempts to pay a bill, the Internet bill payment application collects any of the following, but not limited to: an account number, an IP address of a requestor, an amount paid and billing information of a biller to be paid. When the Internet bill payment application creates the detailed log for an accessed user record that is flagged with the verbose logging parameter, the Internet bill payment application collects, for example, in addition to the above-noted information, any of the following, but not limited to: the date and time of the current login, the date and time of the last login, and the Internet browser and operating system from which the customer is connecting to the Internet bill payment application. In another embodiment, the Internet bill payment application creates the detailed log for a particular banking transaction that uses the user record that is flagged with the verbose logging parameter.

In one embodiment, information provided to the first application is provided to one or more of the downstream applications. In the above-noted Internet bill payment example, information provided to the first application includes information provided by a user, such as a three-digit credit card security code. In another embodiment, the information provided to the first application is obtained from a source other than a user, for example, a network element, server, database or service provider. A non-limiting example of information provided to the first application obtained from a source other than the user includes: credit history information for the user obtained from a credit bureau, information regarding collection accounts for the user obtained from one or more collection agencies and information obtained from a database specifying a number of times the user applied for a credit card.

In step S204, a time to live parameter for the verbose flag is set. In one embodiment, the time to live parameter has a default value. In another embodiment, the time to live parameter is set by an agent. In yet another embodiment, the time to liver parameter is set by the system or a system administrator when the verbose flag is enabled. The time to live parameter for the verbose flag ensures that detailed logging data is not collected for a period longer than necessary. Consequently, the time to live parameter ensures that resources are not unnecessarily used. The time to live parameter indicates how long the verbose flag should be considered enabled. Once the time to live parameter expires, the verbose flag is ignored, even if the verbose flag is still set.

A first detailed log is generated by the Internet banking and bill payment application in step S206. It should be noted by one of ordinary skill in the art that the first detailed log collects additional features, of any kind, that relate to the identified asset, that relate to the transaction involving the identified asset, or that relate to a transaction that does not involve a predetermined, identified asset. As will also be understood by one of ordinary skill in the art, the first detailed log collects varying level of information as determined by an agent or a system administrator. That is, the level of detail collected in the detailed application log is variable.

In step S208, the first application (i.e., the Internet banking and bill payment application) sends a transaction identifier, the verbose flag and in one embodiment, either or both of the identified asset and a representation of the identified asset to a downstream application. In another embodiment, the downstream application is not enabled to access the data store storing the verbose flag and the time to live parameter. In the above-noted banking transaction example, the downstream application is, for example, an authentication application.

When the Internet banking and bill payment application sends a transaction identifier and the verbose flag, and in one embodiment, the identified asset or a representation of an identified asset, the authentication application collects information to generate a first downstream detailed log for the identified asset, in step S210. In one embodiment, the authentication application regularly collects an IP address, a user name, a password, an account number and summary details relating to the banking transaction. When the authentication application receives the transaction identifier and the verbose flag from the Internet banking and bill payment application, the authentication application (i.e., the first downstream application) collects additional data including information about keystrokes and time between keystrokes, an Internet domain from which the Internet banking and bill payment application is accessed and a uniform resource locator (URL) for a forwarding website. Alternatively or in addition to the additional data, the authentication application more granular details about the banking transaction identified by the transaction identifier. For example, the authentication application regularly collects information about the success or failure of authenticating the customer and when the authentication application receives the transaction identifier and the verbose flag from the Internet banking and bill payment application, the authentication application (i.e., the first downstream application) collects information about other entities contacted in sub-transactions and the status of each of the sub-transactions.

If the downstream application (i.e., the authentication application in the above-noted example) is compliant with the data store, the downstream application directly accesses the data store to obtain access to the identified asset. In another embodiment, the downstream application receives the identified asset or a representation of the identified asset from the first application. Every downstream application involved in the transaction uses the verbose flag to generate downstream detailed logs. In one embodiment, downstream applications are not "aware" of the identified asset, but collect more detailed logs based on receiving the transaction identifier and the verbose flag. In another embodiment, the first application is not aware of one or more of the downstream applications. In yet another embodiment, the number or identities of applications involved in a transaction are not known a priori. In still another embodiment, the verbose flag and/or the transaction identifier as passed a part of header information for a request message. As will be understood by one of ordinary skill in the art, any number of downstream applications, that are connected either serially or in parallel to the first application, will receive the verbose flag, transaction identifier, and possibly the identified asset and/or a representation of the identified asset, which in this example, is the user record.

When the verbose flag is not enabled, a log entry generated by the downstream authentication application indicates whether the user was authenticated. When the verbose flag is enabled, the downstream detailed log collects information of finer granularity that details the progress of the transaction, in one embodiment, in the form of sub-transactions. For example, the downstream detailed log includes information that indicates "username and password successfully received; allowable character length check initiated; allowable character length check completed; password decrypted; search for matching username in database; match decrypted password with password stored in database successful; user authenticated successful; display user authentication message success."

That is, in one embodiment, the detailed log indicates the passage of the identified asset between one or more software code segments of the first application. In another embodiment, the detailed log collects information about the success, failure and status of sub-transactions involving the identified asset. In yet another embodiment, the detailed log indicates the progress of the transaction among any of the following, but not limited to: code segments of a single software application, code segments of more than one software application, code segments of one or more software application, the one or more software application being implemented on more than one physical device, components of an apparatus, network elements in a network and devices in a system. As disclosed above, detailed logs may be collected based on receiving the transaction identifier and the verbose flag at: downstream applications that are not "aware" of the identified asset; a first application is not aware of one or more of the downstream applications; and at one or more applications involved in the transaction for which identities are not known prior to the start of the transaction.

In step S212, detailed logging information is collected from the first application and each of the downstream applications. The detailed logging information is correlated using the transaction identifier and/or the user record. A single, correlated log, including all of the information from each of the logs is prepared and presented to a system administrator, agent or other individual, system or application troubleshooting the current transaction, in step S212. In this manner, it is possible to identify the source of an issue and resolve the issue without the need for obtaining detailed information for each of the user records stored in the database or for each of the transactions occurring in the system. In one embodiment, the correlated log includes uniform resource locator (URL) links to detailed logging information collected from the first application and each of the downstream applications. The detailed log is either stored at a centralized location or at a distributed location. The downstream detailed logs are either stored at a centralized location or at distributed locations. In another embodiment, the URL links are links to entries in the detailed log or the downstream detailed logs. The correlated log is accessible by the agent or the system via any of, but not limited to: an Internet or intranet webpage, a short messaging system (SMS) message and an email. As will be understood by one of ordinary skill the art, correlation takes place either centrally or locally, as will be explained in more detail below.

In step S214, the correlated log is presented to the agent, the system administrator or sent to an automated rules processor. When the correlated log is presented to the agent or system administrator, the agent or system administrator determine a course of action to resolve or address the issue. When the correlated log is presented to the automated rules processor, the automated rules processor determines a proposed course of action to resolve the issue. Also in step S214, the automated rules processor optionally implements the proposed course of action, automatically, for the agent or system administrator.

In step S216, a time to live parameter associated with the verbose flag for the identified asset expires and the verbose flag for the identified asset is purged. In this manner, detailed logs are not obtained indefinitely for the flagged identified asset, transactions involving the flagged identified asset, and flagged transactions.

Figure 3:
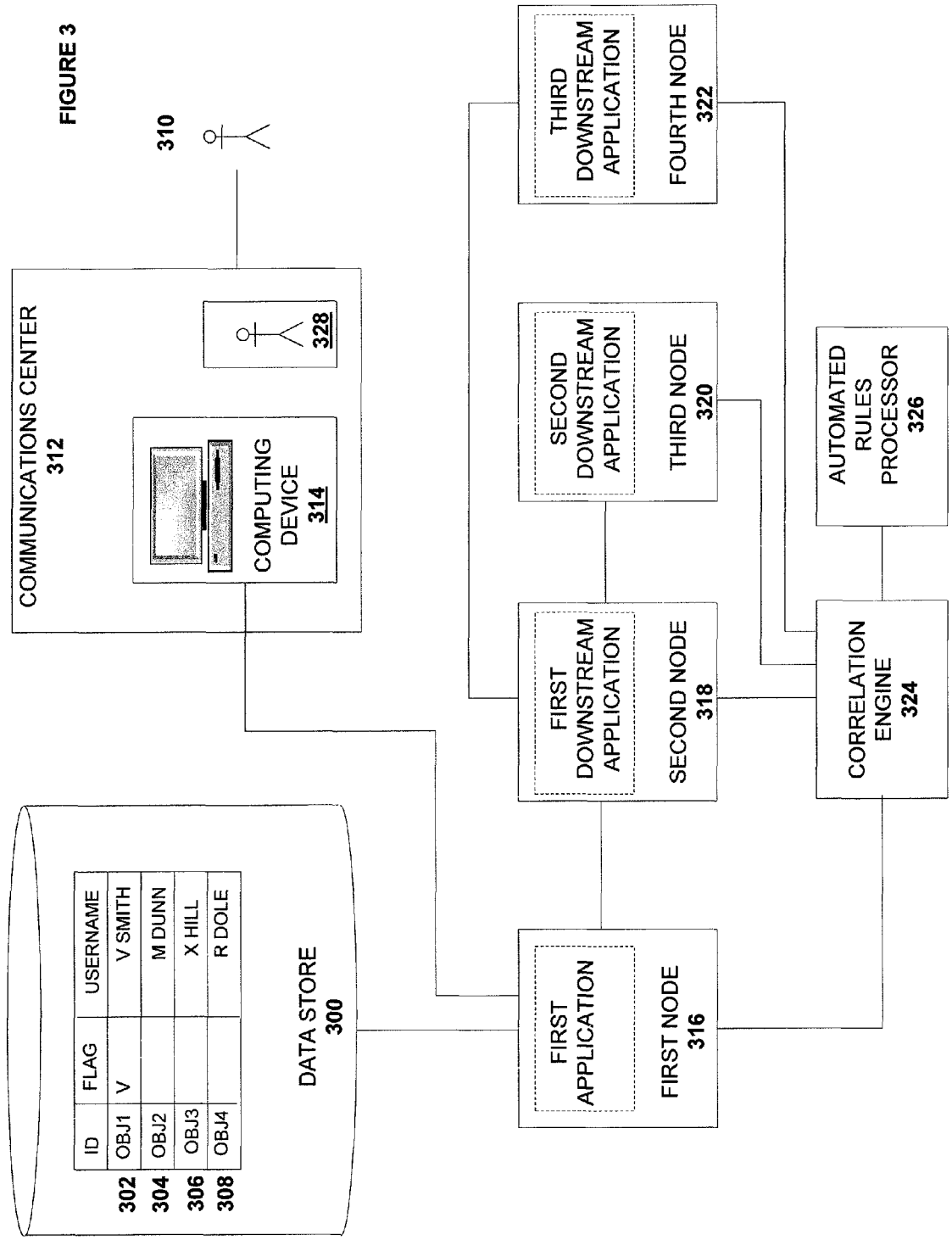
FIG. 3 shows a system diagram for selectively logging data based on a set parameter, according to an aspect of the present disclosure.

In FIG. 3, a system diagram according to an aspect of the present application is shown. The identified asset, is, for example, a user record stored in a data store. In another embodiment, the identified asset is more than one user record, or a subset of all the user records stored in the data store. In yet another embodiment, the identified asset is a network element such as a network gateway, router, server, or any other physical apparatus present in a network that is accessed by more than one party. In FIG. 3, the identified asset is illustrated as being a record 302 in a data store 300. In one embodiment, the record 302 is accessed to provide a service, provisioned by a service provider, to a customer. In the following example, reference will be made to the above-noted service. Initially, a customer 310 contacts a communications center 312 and requests help installing and activating a set-top box. An agent 328 at the communications center 312 uses a computing device 314 to access the data store 300 and in particular, the record 302 associated with the customer 310. The agent 328 then sets the verbose flag in data store 300 for record 302.

The agent 328 asks the customer 310 to re-attempt to connect and install the set-top box. As understood by one of ordinary skill in the art, the set-top box is illustratively used by way of non-limiting example, and is substitutable with any other device, product or service. A first application implemented on a first node 316 is, in the exemplary embodiment, a provisioning application that accesses the data store 300 to obtain the identified asset. The first node 316, as well as second node 318, third node 320 and fourth node 322 which are described in detail below, are any tangible physical device upon which a software application is implementable. For example, a node is any of the following, but not limited to: a processor, a network element, a server, a computing device, a physical storage and a physical memory. Although first node 316, second node 318, third node 320 and fourth node 322 are illustrated in FIG. 3 as being three separate devices, it is noted that one or more applications are implementable on a single node. That is, each of the first application, the first downstream application, the second downstream application and the third downstream application are implementable one or any number of nodes.

Further, first node 316, second node 318, third node 320 and fourth node 322 are illustrated in FIG. 3 as being connected in a particular configuration. However, as will be understood by one of ordinary skill in the art, the first node 316 may be in direct communication with fourth node 322 as well as second node 318. Moreover, the first application may be in direct communication with the third downstream application. As will be understood by one of ordinary skill in the art, applications may communicate with each other in any number of configurations not limited to that described with respect to FIG. 3. Accordingly, applications and nodes are connectable in different configurations not described herein.

When the first application on the first node 316 attempts to send to a configuration file containing operation instructions to the set-top box for the customer 310, the first application on the first node 316 refers to the IP address stored in the record 302 obtained from the data store 300. Since the record 302 is designated with a verbose flag, the first provisioning application on the first node 316 logs, in addition to the time and date of the attempt to send the configuration file, a number of failed attempts, a time between an attempt and an acknowledgment of the failed attempt and an error code returned by the set-top box as part of the detailed log. The first application 316 sends a transaction identifier and a verbose flag to at least one downstream application implemented on the second node 318. In another embodiment, any of the record 302, a representation of the record 302 and the first detailed log generated by the first application on the first node 316 are also sent to the first downstream application implemented on the second node 318.

The transaction identifier includes any of the following, but is not limited to: an alphanumeric character string, a digital watermark, a bit sequence, a text file, an audio file, a video file and a graphics file. The transaction identifier is any machine readable representation of a transaction involving the identified asset (i.e., record 302). The transaction identifier is associated with the detailed log generated by the first provisioning application on the first node 316.

When the first provisioning application on the first node 316 is unable to successfully send the configuration file to the set-top box, the first provisioning application on the first node 316 sends the transaction identifier and the verbose flag to downstream application implemented on the second node 318. In one embodiment, the first provisioning application 316 also sends a copy of the record 302 stored in data store 300 to the first downstream application on the second node 318. In another embodiment, the first downstream application on the second node 318 accesses the data store 300 to obtain record 302. As will be understood by one of ordinary skill in the art, the record 302 or a representation of the record 302 are not necessarily sent to or used by any of the downstream applications.

In the exemplary embodiment illustrated in FIG. 3, the first downstream application on the second node 318 is a billing application. The billing application on the second node 318 collects information to determine whether the customer 310 has paid a current bill. The billing application on the second node 318 collects more detailed information regarding whether the customer 310 has paid a current bill, when the verbose flag is sent, to generate a first downstream detailed log. For example, the billing application on the second node 318 checks the form of payment used in the last payment to determine whether the payment method has expired.

In one embodiment, the detailed log generated by first provisioning application on the first node 316 is sent to the billing application 318 and the billing application 318 merges the first detailed log and the downstream detailed log. As will be understood by one of ordinary skill in the art, the merged first detailed log and the downstream detailed log are merged by any of downstream application prior to sending to an automated rules processor 326. Alternatively, the first detailed log and the downstream detailed log or logs are individually sent to the correlation engine 324 and correlated into a single, correlated log prior to sending to the automated rules processor 326.

In one embodiment, the detailed application log collected by the first provisioning application on the first node 316 and the downstream detailed log generated by the billing application on the second node 318 are sent to correlation engine 324. The correlation engine 324 uses the transaction identifier associated with each of the logs to prepare a single, correlated log. The correlated log is presented to the agent 328 or a system administrator. In one embodiment, the agent 328 is automated. In another embodiment, the agent 328 is human. The agent 328 uses the correlated log to determine a course of action to resolve an issue facing the customer.

In yet another embodiment, the first downstream application on the second node 318 sends the transaction identifier and the verbose flag to a second downstream application implemented on the third node 320 and a third downstream application implemented on the fourth node 322. The second downstream application is any of the following, but not limited to: a hypertext transfer protocol (HTTP) application that formats and sends error messages to the agent 328 and/or the customer 310 and an email client application that sends an email to the customer 310. The third downstream application is any one of the following, but not limited to: an installer dispatch application and an internal audit application. As will be understood by one of ordinary skill in the art, the applications are any application involved in the transaction and are not limited to the examples described herein.

In one embodiment, the correlation engine 324 sends the correlated log to the automated rules processor 326 that determines and/or implements proposed courses of action to address the issue facing the customer 310. Alternatively, the correlation engine 324 sends the correlated log to the agent 328. In the exemplary embodiment illustrated in FIG. 3, the agent 328 determines, from the correlated log, that the payment method used last time had expired and therefore the customer's set-top box had been deactivated. In another embodiment, the correlated log indicates that when the customer 310 rebooted the set-top box, that the authentication request was denied. The correlated log would also indicate that the set top box for customer 310 is a version not matching the record 302 or is no longer supported by the system. Accordingly, the automated rules processor 326 would propose a course of action that includes updating the record 302 to indicate the version of set-top box that the customer 310 has.

Accordingly, the present invention enables selectively logging application information, using variable levels of detail, based on a set parameter.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims. For example, when a customer attempts to use a video-on-demand product and is unable to do so, the customer contacts a call center and is put in touch with an agent. The agent sets a verbose flag in a lightweight directory access protocol data store and asks the customer to repeat the action. Typically, an application involved with the video-on-demand transaction for which the verbose flag has not been set will log an entry such as the following:

INFO TransId Video On Demand "Foul Play" purchase 12:57 Aug. 31, 2009 by ccwechsler for $1.99.

An application involved with the video-on-demand transaction for which the verbose flag has been set will log an entry such as the following:

DEBUG TransId Starting VoD "Foul Play" purchase
    DEBUG TransId Deducting $1.99 from credit limit for ccwechsler
    TRACE TransId Checking for enough credit
    TRACE TransId Have enough credit
    INFO TransId Video On Demand "Foul Play" purchase 12:57 Aug. 31, 2009 by ccwechsler for $1.99
    DEBUG TransId Finished VoD "Foul Play" purchase.

As shown above, all applications that are involved with the video-on-demand transaction log enhanced details for the particular transaction associated with customer. A correlated log is provided to an automated rules processor, or alternatively, directly to the agent. The agent determines that when the customer tried to purchase video-on-demand services, the requested product was not properly stored as being requested by the customer in a data store object. The agent resolves the customer's issue by eliminating the data discrepancy and updating the data store object. In one embodiment, the agent forgets to turn off verbose logging for the specified data store object. A time to live parameter associated with the verbose logging flag expires, and applications cease logging detailed information for the data store object. Finally, a purge process removes expired verbose logging settings.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packed switched network transmission, application messaging and data storage represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of providing asset-based logging, comprising:
setting a flag for at least one of an identified asset and a transaction prior to logging activity relating to the at least one of the identified asset and the transaction occurring;
generating, based on the set flag, a first detailed log for logging activity related to at least one of the identified asset and the transaction by a first application implemented on a first node;
passing a transaction identifier, the flag, and any of the identified asset, information generated by the first application implemented on the first node, information provided to the first application implemented on the first node and a representation of the identified asset to at least one downstream application implemented on at least one second node; and
correlating detailed logs, generated by the at least one downstream application for logging activity related to the at least one of the identified asset and the transaction by the at least one downstream application, based on the set flag, with the first detailed log for logging activity related to the at least one of the identified asset and the transaction by the first application.

2. The method according to claim 1,
wherein the transaction involves the identified asset.

3. The method according to claim 1,
wherein the identified asset comprises a specified subset of objects stored in a data store.

4. The method according to claim 1,
wherein the first detailed log and the detailed logs collect more detailed information than logging information collected for a transaction that is not designated with the flag, and
wherein the first detailed log and the detailed logs collect more detailed information than logging information collected for an identified asset that is not designated with the flag.

5. The method according to claim 1,
wherein a correlated log is used to resolve an issue experienced by a user corresponding to at least one of the identified asset and the transaction.

6. The method according to claim 1,
wherein a time to live parameter is set for the flag, and
wherein the flag is purged after the time to live parameter expires.

7. The method according to claim 1, further comprising:
passing a request, encapsulating the flag and the transaction identifier, to the at least one downstream application.

8. The method according to claim 6,
wherein a path, through the first node and the at least one second node, corresponding to the transaction is undetermined prior to initiating the transaction, and
wherein a correlated log indicates the path corresponding to the transaction.

9. The method according to claim 6,
wherein the detailed log collects information relating to at least one sub-transaction involving the identified asset.

10. The method according to claim 1,
wherein the detailed log collects information relating to at least one sub-transaction of the transaction.

11. A system of providing asset-based logging comprising:
a generator that generates, based on a preset flag, a first detailed log to log activity, related to at least one of an identified asset for which the flag is preset prior to the log activity occurring and a transaction for which the flag is preset prior to the log activity occurring, by a first application implemented on a first node;
a transmitter that passes a transaction identifier, the flag, and any of the identified asset, information generated by the first application implemented on the first node, information provided to the first application implemented on the first node and a representation of the identified asset to at least one downstream application implemented on at least one second node; and
a correlation engine that correlates detailed logs generated by the at least one downstream application for logging activity related to the at least one of the identified asset and the transaction by the at least one downstream application, based on the set flag, with the first detailed log for logging activity related to the at least one of the identified asset and the transaction by the first application.

12. The system according to claim 11,
wherein the first application implemented on the first node is enabled to access a time to live parameter and the flag.

13. The system according to claim 11,
wherein a level of detail provided by at least one of the first detailed log and the detailed logs is variable.

14. The system according to claim 11, further comprising:
an automated rules processor that determines a course of action to resolve an issue based on the correlated log.

15. The system according to claim 11,
wherein the first node is at least one of a processor, a network element, a server, a computing device, a physical storage and a physical memory, and
wherein the at least one second node is at least one of a processor, a network element, a server, a computing device, a physical storage and a physical memory.

16. The system according to claim 11,
wherein a correlated log comprises at least one uniform resource locator (URL) link to at least one of: the first detailed log, the detailed logs, a portion of the first detailed log and a portion of the detailed logs.

17. The system according to claim 11,
wherein the detailed log collects information relating to passage of at least one of: the identified asset and information specified by the identified asset among portions of the first application.

18. The system according to claim 11,
wherein the detailed log collects information from at least one of the identified asset and a user.

19. The system according to claim 14,
wherein the course of action does not require human intervention.

20. A tangible, non-transitory, computer readable medium that stores a program, recorded on the tangible computer readable medium, for providing asset-based logging, the tangible, non-transitory, computer readable medium comprising:
a setting code segment, recorded on the tangible computer readable medium, that sets a flag for at least one of an identified asset and a transaction prior to logging activity relating to the at least one of the identified asset and the transaction occurring;
a generating code segment, recorded on the tangible computer readable medium, that generates, based on the set flag, a first detailed log for logging activity related to at least one of the identified asset and the transaction by a first application implemented on a first node;
a passing code segment, recorded on the tangible computer readable medium, that passes a transaction identifier, the flag, and any of the identified asset, information generated by the first application implemented on the first node, information provided to the first application implemented on the first node and a representation of the identified asset to at least one downstream application implemented on at least one second node; and
a correlating code segment, recorded on the tangible computer readable medium, that correlates detailed logs generated by the at least one downstream application for logging activity related to the at least one of the identified asset and the transaction by the at least one downstream application, based on the set flag, with the first detailed log for logging activity related to the at least one of the identified asset and the transaction by the first application.

* * * * *